3,196,120
HEAT-CURABLE COATING COMPOSITIONS CONTAINING POLYHYDRIC ALCOHOLS
Joseph E. McLaughlin, Philadelphia, and Joseph A. Vasta, Sharon Hill, Pa., assignors to E. I. du Pont de Nemours and Company, Wilmington, Del., a corporation of Delaware
No Drawing. Filed Feb. 20, 1961, Ser. No. 90,185
14 Claims. (Cl. 260—23)

This invention relates to improvements in heat-curable coating compositions, especially of the type used as appliance finishes. More particularly, the invention relates to modifications of such coating compositions which provide enhanced adhesion to acid-treated metal substrates containing acid residue contamination as a result of inadequate rinsing. Such acidic contamination, particularly chromic acid, is detrimental to adhesion.

The treatment of corrodible metal surfaces, e.g., ferrous metals, with various acids or combinations of acids, of which phosphoric acids and chromic acid are representative, to provide corrosion resistance and to improve the receptivity of the substrate for organic coatings is well known in the metal protection art and coating art. The need for adequate water-rinsing of the acid-treated metal is not always recognized fully and, in commercial production line operations, rinsing frequently is insufficient for adequate removal of residual acids and other water-soluble residues of the metal treatment. Presence of these contaminating residues retained by the treated metal results in significant impairment of adhesion of the heat-curable coating compositions applied to the metal substrate and heat-cured thereon. Poor anchorage of the first applied coat is detrimental to the finish regardless of whether the finish consists of one coat, a plurality of coats, or a combination of primer coat and one or more topcoats. In combination finishes which include a primer coat applied as the initial coat directly to the metal, the detrimental effect of the contaminating acid residues from the metal treatment is less pronounced than when the finish consists of a single or duoble coat of the topcoat enamel. Ordinarily, compensations can be made in primer formulations to counteract the acid residues. Remedial measures which are satisfactory in primer formulations usually have disadvantageous effects on topcoat performance and therefore such remedies are ordinarily unsuitable for the so-called "one coat" finishes where a single or a double coat of topcoat composition is applied to the acid-treated metal.

The primary objective of this invention is to provide significant improvement in adhesion of heat-curable coating compositions applied directly to a metal substrate in the presence of contaminating acid residues remaining after acidic metal treatment to provide anti-corrosion protection.

This objective and other important objectives hereinafter disclosed are accomplished by including in solution in the liquid heat-curable coating composition an effective small proportion of at least one low molecular weight polyhydric alcohol having 2 to 4 hydroxyl substituents per molecule including at least one primary hydroxyl substituent, preferably a plurality of primary hydroxyl substituents. The more suitable polyhydric alcohols have 2 to 6 carbon atoms and 2 to 3 hydroxyl substituents, including at least two primary hydroxyl substituents per molecule. The coating compositions so modified are applied to the acid-treated metal substrate having acid residue contamination ordinarily detrimental to adhesion and the resulting applied coatings are cured by heating under ordinary curing conditions therefor.

Suitable polyhydric alcohols which function as an effective adhesion-promoting agent in the presence of the acid residue contamination on the treated metal ordinarily detrimetal to adhesion thereto of the cured coating include:

Ethylene glycoly
Propylene glycol
Trimethylene glycol
Tetramethylene glycol
Pentamethylene glycol
Hexamethylene glycol
Butanediol-1,2
Butanediol-1,3
Isobutylene glycol
Glycerol
Trimethylolethane
Trimethylolpropane
Butanetriol-1,2,3
Butanetriol-1,2,4
Butanetetrol-1,2,3,4
Pentaerythritol
Pentanetriols
Hexanetriols
Neopentyl glycol, i.e., 2,2-dimethyl propanediol-1,3
Cis-butenediol
Diethylene glycol
Dipropylene glycol Other low molecular weight polyhydric alcohols having more than 6 carbon atoms per molecule, e.g., those having a higher molecular weight up to about 200, can be used but they are less desirable because of the higher weight proportions required to provide an effective contribution and these higher proportions coupled with lower volatility leave residues in the coating which may adversely affect the properties of the cured coating. While some species having more than 4 hydroxyl substituents can be used, they tend to increase the water sensitivity of the cured coating because of significant retention of these highly soluble species.

Preferred polyhydric alcohols or mixtures thereof have 2 to 6 carbon atoms and 2 to 4 hydroxyl substituents per molecule including a plurality of primary hydroxyl substituents, the ratio of the primary hydroxyl substituents to the total carbon atoms per molecule being preferably in the range of 0.5 to 1 per carbon atom. The especially preferred of these species are those having 2 to 3 hydroxyl substituents including at least two primary hydroxyl substituents, e.g., the alpha, omega dihydric species: ethylene glycol, trimethylene glycol, tetramethylene glycol and diethylene glycol, and the trihydric species: glycerol, trimethylolethane, and trimethylolpropane.

Effective proportions of the polyhydric alcohol are usually in the range of 0.3% to 6% based on the weight of the liquid coating composition. With the more volatile species which are readily lost by volatilization during heat-curing, e.g., ethylene glycol, the proportion can be up to 10% without detrimental effect on the cured final coating. Preferred proportions are in the range of 0.5 to about 4%.

The composition of the heat-curable coatings designed for application to the metal substrate is not particularly critical. However, an important consideration is that the polyhydric alcohol should be soluble in the liquid coating composition to provide uniform distribution of the polyhydric alcohol throughout the composition and to provide thereby intimate contact between the treated metal surface contaminated with acid residues and the liquid coating containing the remedial polyhydric alcohol. Another important consideration is that the organic film-forming materials should tolerate the presence of any residues of the polyhydric alcohol remaining after heat-curing of the applied coating, curing being carried out ordinarily at a baking temperature in the range of 250° F. to 400° F.

Coating compositions of the baking type designed for use as appliance coatings which can be applied directly to metal or over primed metal are well described in the coating art. Typical compositions are described in U.S. Patents 2,967,162; 2,940,945; 2,940,944; 2,934,516; 2,931,742; 2,870,117; 2,662,870 and 2,604,464. For example, in U. S. Patent 2,967,162 the organic film-forming material consists essentially of a compatible combination of (A) an interpolymer made up of units from styrene, units from an ester of acrylic acid and a lower saturated aliphatic monohydric alcohol and units from a half ester of a butenedioic acid, e.g., maleic, and a saturated aliphatic monohydric alcohol and (B) a heat-curable resin such as for example aminoplast condensates of the melamine - formaldehyde - monohydric - alcohol, urea - formaldehyde - monohydric - alcohol, benzoguanamine-formaldehyde-monohydric-alcohol types, epoxy resins having at least one 1,2-oxirane group per molecule, e.g., epoxyhydroxypolyether resins, and epoxidized oils. These essential organic film-forming materials are in solution in a volatile liquid organic solvent therefor. Appropriately pigmented, these coating compositions are useful particularly as appliance finishes of the washing machine, drier, freezer and refrigerator type which can be applied to a metal substrate with or without a prime coat. These coating compositions may contain compatible ancillary materials ordinarily used in coating compositions to appropriately modify the basic formulations containing the indicated essential components, e.g., plasticizers, silicone oils and resins, curing agents, driers, etc. can be added.

Species of the above-described coating compositions with which the addition of the polyhydric alcohol is particularly effective are those in which the interpolymer component has carboxyl units from an alpha ethylenically unsaturated monomer such as methacrylic acid, acrylic acid, or partial esters of alpha ethylenically unsaturated polycarboxylic acids such as maleic, fumaric and itaconic, the carboxyl substituent being present preferably in the proportion of 1 to 25 mol percent of carboxyl units per interpolymer molecule.

Useful monomers making up the balance of the units of the carboxyl-containing interpolymer can be selected widely to provide the interpolymer with desired characteristics in reference to the end use of the coating composition formulated therewith. A mixture of two or more of the non-carboxylic monomers is used ordinarily in combination with the carboxylic monomer to provide the interpolymer with a desired balance of properties. Esters of acrylic acid and alkanols having up to 20 carbon atoms per molecule are particularly useful and inasmuch as these monomers yield soft homopolymers, they are used in combination with monomers which yield harder homopolymers. Esters of methacrylic acid and alkanols, particularly the lower $C_1$ to $C_4$ alkanols, are ester monomers useful in combination with the plasticizing acrylates. Vinyl aromatic hydrocarbon monomers are used advantageously in combination with the acrylate monomers. Vinyl benzene, i.e., styrene, and lower alkyl-substituted vinyl benzenes are preferred hydrocarbon monomers.

Combinations of the essential organic film-forming material having the preferred carboxyl-containing interpolymer preferably include an epoxy material in combination therewith, the epoxy material having at least one 1,2-oxirane group per molecule. Useful epoxy compounds having the essential 1,2-oxirane functionality include diphenylol propane diglycidyl ether, polymeric epoxyhydroxy polyethers resulting from condensation of diphenylolpropane or other polyhydric phenols with epichlorohydrin such as prepared in accordance with well known methods, such as those disclosed in U.S. 2,503,726, 2,528,985, 2,592,560 and 2,694,694. These epoxyhydroxy polyether resins contain one or more 1,2-oxirane groups per molecule. Those having an average of more than one such epoxy group per molecule are preferred; fatty acid esters of such epoxyhydroxy polyether condensates prepared as described in U.S. 2,456,408; and epoxidized oils prepared, following known processes such as are disclosed in U.S. 2,569,502, by epoxidizing the naturally-occurring or equivalent oil esters synthesized from glycerol or other polyhydric alcohols, e.g., sorbitol and the $C_8$–$C_{22}$ vegetable oil acids, of which at least one is ethylenically unsaturated. Examples of such unsaturated oils include soya oil, linseed oil, dehydrated castor oil, perilla oil, cottonseed oil, etc. Epoxyhydroxy polyether resins useful in practicing this invention are also available on the open market, for example, "Epon"-828, -1001, -1004, -1007; "Araldite"-6030, -6071, -6084, -6097; and "Epi-Rez"-510, -520, -530C, -540. Useful epoxidized vegetable oils can be purchased also on the open market. Examples are "Paraplex" G–60 and G–62 and "Admex" 710.

Another source of epoxy compounds having 1,2-oxirane functionality are polymers of esters of glycidyl, i.e., 2,3-epoxypropanol-1, and an alpha, monoethylenically-unsaturated monocarboxylic acid, e.g., glycidyl methacrylate or acrylate, allyl glycidyl ether, and interpolymers of these glycidyl monomers with another monoethylenically-unsaturated monomer copolymerizable therewith.

In these preferred combinations of organic film-forming materials, the carboxyl-containing interpolymer A usually is present in the proportion of 30% to 95%, preferably 60% to 90%, by weight of the organic film-forming combination A and B. The curable B component complementally is 70% to 5% of the combination and usually includes at least 5% of the epoxy material having one or more 1,2-oxirane groups per molecule. Preferably the content of the epoxy material is 10% to 40% of the combination of A and B.

Some preferred formulations are at least ternary in composition, including at least one heat-reactive aminoplast condensate of the groups of melamine-formaldehyde-alcohol, urea-formaldehyde-alcohol and benzoguanamine-formaldehyde-alcohol condensates. These aminoplast condensates useful in the coating compositions of this invention are the types commonly used in the organic baking enamels. They are prepared by well known methods involving, fundamentally, reacting melamine and formaldehyde or a reaction product thereof, e.g., tetra-, penta- or hexamethylol melamine, with a $C_1$ to $C_4$ saturated aliphatic monohydric alcohol, i.e., methanol, ethanol, propanol, or butanol, usually in excess of the amount required to etherify all of the methylol groups; reacting urea and formaldehyde or a reaction product thereof, e.g., dimethylol urea, with one of the indicated $C_1$–$C_4$ alcohols; or reacting benzoguanamine and formaldehyde or a reaction product thereof with the $C_1$–$C_4$ alcohol. Suitable methods are disclosed in U.S. 2,191,956 and 2,197,357. A wide variety of suitable condensates of these types are readily available in the resin market usually in the form of solutions containing 50%–60% of the non-volatile condensate in a convenient volatile solvent. Coating resins of these classes are commercially available by several suppliers under such trade names as "Resimene," "Uformite," "Plaskon," "Beetle," "Melmac" and "Beckamine." Ordinarily, useful proportions of the aminoplast condensates range up to 60% by weight of the entire organic film-forming material. As indicated from the proportions recited for the essential film-forming materials, the aminoplast condensate can be entirely absent from the composition, i.e., the proportion of aminoplast condensate ranges from 0 to 65%.

Suitable solvents, and diluents which can be used in admixture with solvents, include aromatic and aliphatic hydrocarbons, alcohols, ketones, and esters. Mixtures of aromatic hydrocarbons, such as xylene, and aliphatic monohyric alcohols, such as butanol, are preferred. The solvent or solvent mixture, and any diluent which may be used, preferably characterized by a boiling end point no greater than 200° C., must be volatile to the extent that it evaporates readily from a wet coating during the subsequent baking step, i.e., drying or curing, and leaves a dry coating. The amount of solvent, plus diluent if used, is not critical. It usually is within the range of 10%–85% of the total coating composition, i.e., the non-volatile content may be from 15% to 90% for pigmented compositions. The content of organic film-forming material may be as low as 5% in practical clear compositions.

Examples of suitable pigments which may be used include metal oxides, hydrous metal oxides, chromates, silicates, sulfides, sulfates and carbonates, carbon blacks, organic dyestuffs and lakes thereof and metal flake pigments like aluminum. Since the interpolymers contain free carboxyl groups, acid-sensitive and strongly basic reacting pigments are preferably avoided. The amount of pigment is not critical. It usually is within the range of 1%–200% by weight of the total organic film-forming material present.

The coating compositions can be applied by any conventional method such as spraying, brushing, dipping, flowing or roller coating. Spraying is preferred. The coatings are baked by conventional methods to harden and insolubilize them and to develop the improved properties to an optimum degree. Baking times and temperatures are not critical but, in order to obtain the best results, the widely used commercial baking schedules are preferred. These range from 45–60 minutes at about 250° F. to 10–20 minutes at about 400° F. The optimum range is usually from 30–45 minutes at about 280° F. to 20–30 minutes at 350° F.

The coatings can be applied to any heat-resistant substrate which withstands the indicated curing conditions. However, these coatings are primarily designed for application to metal substrates, especially ferrous sheet metal substrates which are treated for anti-corrosion protection with acidic compositions which may include chromic acid, phosphoric acid or both, such treatment being referred to sometimes as "Bonderizing."

The peculiar advantage of the presence of the polyhydric alcohol in these coatings applied to metal substrates so treated and having contaminating acid residues present as a result of inadequate rinsing for removal of the contaminants, is the development of improved adhesion to the substrate in comparison with the poor adhesion resulting when a similar composition, except for the absence of the polyhydric alcohol, is applied to the contaminated substrate and cured in the usual manner. When applied to such treated metal substrates rinsed free of contaminants detrimental to adhesion, the coating compositions containing the small proportion of polyhydric alcohol registers no significant improvement in adhesion over the composition which does not contain the polyhydric alcohol. Presence of the polyhydric alcohol in the liquid coating composition provides improvement in stability of the composition which is an advantage aside from functioning as an adhesion promoter in the presence of the contaminating acid residues. Presence of proportions of the polyhydric alcohol effective in promoting adhesion in the presence of the residual acid contaminants do not adversely affect the working properties of the liquid coating, the film properties or performance of the cured coating.

The following examples are provided to illustrate the principles and practice of this invention, but its scope is not limited to the exact details of these illustrative examples. Unless otherwise indicated, the parts and percentages are given by weight.

EXAMPLE 1

| | Parts by weight |
|---|---|
| Titanium dioxide pigment | 280 |
| Terpolymer A solution—55% resin content | 402 |
| Epoxyhydroxy polyether resin ("Epon" 1001) | 42 |
| Epoxidized soya oil ("Paraplex" G-62) | 14 |
| Butanol | 36 |
| Toluol | 41 |
| Isopropanol—anhydrous | 75 |
| Xylol—industrial, 10° F. | 73 |
| Wax dispersion 1 | 20 |
| Polyhydric alcohol—glycerol | 10 |
| Quaternary ammonium catalyst solution I, 20% in xylol | 2 |
| | 1000 |

The terpolymer A solution is prepared according to the following recipe:

| | Parts by weight |
|---|---|
| First portion: | |
| Aromatic hydrocarbon, B.R. 150°–190° C. Aniline point −28° C. ("Solvesso" 100) | 1221 |
| Xylol—industrial, 10° F. | 407 |
| Second portion: | |
| Styrene | 1993 |
| Ethyl acrylate | 1328 |
| Maleic anhydride | 475 |
| Di-tertiary butyl peroxide | 45 |
| Third portion: | |
| 2-ethylhexanol | 1263 |
| Fourth portion: | |
| Butanol | 1328 |
| | 8060 |

The first portion is charged into a polymerization reaction vessel equipped with stirring means, reflux means and temperature control means and heated to reflux temperature, i.e., about 154° C. Then the premixed second portion is added with moderate stirring to the refluxing first portion at a uniform rate during a two-hour period, the rate being such that the temperature is maintained in the range of 140° to 154° C. Refluxing of the charge is continued for two additional hours. The third portion is added to the resulting polymer solution and refluxing is continued for two hours under which conditions one of the two carboxyl substituents of each maleic acid unit of the terpolymer is esterified with 2-ethylhexanol. Thereafter, the fourth portion, i.e., the butanol as a solvent, is added slowly with mixing over a 30-minute period as the solution is allowed to cool. The resulting interpolymer is made up essentially of units in the following approximate proportions: 51.4 mol percent styrene, 35.6 mol percent ethyl acrylate and 13 mol percent 2-ethylhexyl acid maleate which correspondingly on a weight basis is about 45% styrene, 30% ethyl acrylate and 25% 2-ethylhexyl acid maleate. The resulting solution of the interpolymer in the mixture of hydrocarbon solvents, butanol, and unreacted 2-ethylhexanol is characterized as follows:

| | |
|---|---|
| Interpolymer content | 55%. |
| Acid number | 62. |
| Gardner-Holdt viscosity | $Z_1$ at 25° C. |
| Relative viscosity | 1.135. |

Relative viscosity is determined by first spreading about 2–3 cc. of interpolymer solution over an area of about 3 square inches in an aluminum foil dish and heating the thus-prepared sample dish in an oven at about 120° C. for 3 hours to obtain interpolymer substantially free from solvent. From the resulting dry interpolymer, a solution is made containing 0.50 gram of interpolymer in 50 ml. of ethylene dichloride. The efflux time of this solution is measured at 25° C. in accordance with ASTM–D–445–53T using the solution as the "oil" in said ASTM method.

A Cannon-Fenske (modified Ostwald) viscosimeter for transparent liquids, series or size number 100, is used in accordance with appendix A of the designated method. The efflux time of a sample of the ethylene dichloride used in making said solution is likewise determined. Relative viscosity, $N_r$, of the interpolymer is calculated from the equation:

$$N_r = \frac{\text{efflux time of polymer solution}}{\text{efflux time of ethylene dichlorine}}$$

Other carboxylic terpolymer solutions prepared according to the teachings of U.S. Patent 2,967,162 can be substituted wholly or in part for the terpolymer A solution. "Epon" 1001 is a resinous epoxyhydroxy polyether condensate having 1,2-oxirane groups and hydroxyl groups resulting from condensation of diphenylol propane and epichlorohydrin in proportions of these reactants and under conditions which yield a resin characterized by an epoxide equivalent weight in the range of 450 to 525, an esterification equivalent weight of about 145 and a melting point in the range of 64° to 76° C. by the Durran mercury method. For convenience in handling, the epoxy resin can be as a preformed solution. A typical solution consists of "Epon" 1001 at 50% concentration in a mixed solvent made up of equal parts by weight of 10° xylol and anhydrous isopropanol.

The quaternary ammonium catalyst Solution I consists of octadecyl trimethylammonium acid phthalate at 20% concentration in xylol.

The wax dispersion 1 is prepared by pebble-grinding the following composition for 72 hours:

| | Parts |
|---|---|
| Interpolymer A solution—55% | 30.3 |
| Polymerized microcrystalline wax 200/220° F. | 14.8 |
| Butyl alchol | 53.4 |
| Ethylenediamine tetraacetic acid—stabilizer | 1.5 |
| | 100.0 |

"Polymekon" wax is a representative useful polymerized microcrystalline wax having a melting point in the range of 200° to 220° F. Cardis polymer #10 wax, a polymerized-oxidized wax of petroleum origin characterized by the ASTM-D-87-57 melting point of 310° to 220° F., saponification number of 25 to 30 and an acid number of 8 to 10, and other waxes of equivalent characteristics can be used in place of the specified microcrystalline wax.

The ethylenediamine tetraacetic acid, designated for convenience as EDTA, is commercially available under the designations "Versene" acid and "Sequestrene" AA. Use of EDTA and other polyamine polyacetic acids as a stabilizer for quaternary ammonium salt catalyzed coating compositions of the type described above is disclosed and claimed in copending U.S. patent application Vasta, Serial No. 86,852, filed February 3, 1961 now U.S. Patent No. 3,154,598. Presence of these polyamine polyacetic acid stabilizers is not essential to the functioning of the polyhydric alcohol as an adhesion promoter in the present invention and these polyamine polyacetic acids can be omitted from the formulations.

The coating composition is prepared by dispersing the pigment in a portion of the terpolymer solution as a first portion, using ordinary dispersion techniques. The remaining components of the recipe are added and mixed with the completed dispersion portion. The catalyst solution is preferably added last and, if desired, may be separately packaged and combined with the uncatalyzed portion prior to use.

The resulting coating composition contains about 56% of non-volatile coating materials including about 28% of pigment, 28% of resinous organic film-forming materials and the wax in the proportion of about 1 part per 100 parts of the organic film-forming materials. The content of EDTA is about 0.11 part per 100 parts of the organic film-forming material. The catalyst concentration is about 0.14 part per 100 parts of the organic film-forming material. One hundred parts of the organic film-forming material, exclusive of the wax, consists of approximately 80 parts of the terpolymer, 15 parts of the epoxy resin and 5 parts of the epoxidized soya oil.

EXAMPLES 1a and 1b

These compositions are identical with that of Example 1 except the concentration of glycerol is 0.5% and 2% respectively, the weight difference being compensated by either increasing or decreasing the content of isopropanol.

A comparative composition A is prepared identical with the recipe for Example 1 except that the glycerol is omitted and the butanol content is increased by 10 parts.

EXAMPLES 2, 2a, 2b, 2c

These compositions are identical with that of Example 1 except that the 10 parts of glycerol are replaced respectively with 10, 20, 30 and 60 parts of ethylene glycol, the weight differences being accommodated by approximately equal adjustment in the content of the xylol and isopropanol.

EXAMPLES 3 and 3a

This composition is identical with that of Example 1 except that the 10 parts of glycerol are replaced with 30 parts and 50 parts respectively of 1,2,6-hexanetriol, the differences of 20 parts and 40 parts being deducted equally from the content of xylol and isopropanol.

EXAMPLE 4

This composition is identical with that of Example 3A except that 50 parts of diethyleneglycol are used in place of the 1,2,6-hexanediol.

MASTER BATCH FOR EXAMPLES 5, 6 AND 7

| | Parts by weight |
|---|---|
| First portion: | |
| Terpolymer A solution—55% resin content | 448 |
| Butanol | 483 |
| Titanium dioxide pigment | 1306 |
| Aromatic hydrocarbon ("Solvesso" 100) | 54 |
| Second portion: | |
| Terpolymer A solution—55% | 1421 |
| Epoxy resin solution—50% in xylol/isopropanol | 522 |
| Butanol | 45 |
| Third portion: | |
| Wax dispersion 2 | 89 |
| Isopropanol | 152 |
| | 4520 |

The terpolymer and the epoxy resin are the same as specified in Example 1. These essential organic film-forming materials are in the relative proportions of 20 parts of epoxy resin per 80 parts of the terpolymer.

Wax dispersion 2 has the following composition:

| | Parts by weight |
|---|---|
| Terpolymer A solution—55% | 30.4 |
| Microcrystalline wax ("Polymekon") | 14.8 |
| Butanol | 54.8 |
| | 100.0 |

The pigment is dispersed in the solution of the terpolymer as defined by the first portion, then the components of the second portion are combined with the completed first portion, and then the third portion is added with the combined preceding portions and the composition is mixed until uniform.

|  | Parts by Weight | | | |
| --- | --- | --- | --- | --- |
|  | Example 5 | Example 6 | Example 7 | Comparative Composition B |
| Master Batch | 970 | 970 | 970 | 970 |
| Trimethylolpropane | 20 | | | |
| Tetramethylene glycol | | 20 | | |
| cis-Butenediol | | | 20 | |
| Catalyst Solution—20% in Xylol | 2.5 | 2.5 | 2.5 | 2.5 |
| Xylol—10° | 7.5 | 7.5 | 7.5 | 27.5 |
|  | 1,000.0 | 1,000.0 | 1,000.0 | 1,000.0 |

The catalyst solution is the same as that specified in Example 1. Quaternary ammonium perchlorate and other quaternary ammonium salts disclosed in patent art and literature as useful curing agents for the described organic film-forming materials can be substituted in equivalent proportions for the quaternary ammonium acid phthalate specified in the examples without detriment to the functioning of the polyhydric alcohol as an adhesion promoter.

*Evaluation of the coating compositions*

Parker's "Bonderite" 1000 steel panels, i.e., phosphatized anti-corrosion treated ferrous sheet metal, are immersed to about one half their depth in an aqueous 0.3% chromic acid bath at room temperature for about 1 minute, allowed to drain on removal from the bath and dried to remove residual water by heating in an oven for several minutes at a temperature in the range of 200° F. to 225° F. This drying temperature is not critical since the objective is to remove water. Higher temperatures such as up to the usual baking temperatures can be used. Room temperature can be used, but drying cycles are ordinarily too long for commercial operations. These resulting panels thus prepared have about half the surface representing the "Bonderite" 1000 phosphatizing treatment and half the surface representing further treatment with aqueous chromic acid solution which is ordinary practice in commercial finishing operations.

Specimen panels are prepared by spraying the respective liquid coating compositions, i.e., compositions of Examples 1 through 7 and comparative compositions A and B, on the treated panels, covering both the "Bonderite" 1000 area and the chromic acid treated "Bonderite" 1000 area. The coatings are applied at a usual dry coating thickness of about 1.5 to 1.8 mils and cured under usual conditions by heating for 30 minutes at about 320° F. Another series of coated panels is prepared similarly with the coatings being cured by heating for 30 minutes at about 280° F. and still another series is prepared similarly with the coatings being cured by heating for 30 minutes at about 350° F.

Adhesion of the respective cured finishes of the prepared specimen panels to the respective substrates is determined qualitatively by the knife scratch adhesion test and by the conical mandrel test, the conical mandrel being described in Gardner-Sward Physical and Chemical Examination of Paints, Varnishes, Lacquers, Colors, 10th edition (1946), pages 171 and 172.

All of the cured finishes from the compositions of Examples 1 through 7 containing an effective proportion of the polyhydric alcohol register good adhesion to the acid-contaminated area and exhibit no significant differential in adhesion between the "Bonderite" 1000 area and the chromic acid rinsed area.

A comparison between the cured finishes of Example 1 and Example 2 shows that glycerol is more effective than ethylene glycol at the same concentration by weight. Although 1% of ethylene glycol provides a desirable improvement in adhesion, at least about 3% of ethylene glycol is required to provide adhesion results matching those obtained with 1% of glycerol. This difference in results at equal concentration is attributed to the differential in volatility between glycerol and ethylene glycol. Relatively higher proportions of ethylene glycol are required in compensation for this greater volatility. Glycerol provides improvement in adhesion when present at concentrations as low as 0.3%, the preferred minimum being about 0.5%. Examples 2c composition having a content of 6% ethylene glycol provides excellent adhesion to the acid-contaminated metal substrate and because of the high volatility under the heat-curing conditions, any ethylene glycol residues retained in the cured finish are insignificant and have no detrimental effect on the film properties. Because of greater retention as a result of lower volatility under ordinary baking conditions of glycerol and other useful species of polyols having 3 to 4 hydroxyl substituents per molecule, preferred concentrations of these higher polyhydric alcohols ordinarily are no greater than about 4%.

The species of polyhydric alcohols represented by Examples 3 through 7 at the respective concentrations, provide adhesion improvement comparable with that obtained with the 1% to 2% glycerol content represented by the Examples 1 and 1B compositions.

The two comparative compositions A and B, which do not include a polyhydric alcohol in the recipe, exhibit significant adhesion deficiency over the chromic acid rinsed area in comparison with the unrinsed "Bonderite" 1000 area. The adhesion deficiency varies over the chromic acid rinsed area, the adhesion being progressively worse over areas having higher proportions of residual chomic acid. Visual examination of the uncoated panels shows a color differential in the direction of the drip edge from the chromic acid rinse, indicating a variation in chromic acid residue as a result of vertical drainage.

The respective coatings cured at temperatures ranging from 280° F. to 350° F. are subjected to a series of film property tests used ordinarily for characterizing appliance enamels, e.g., flexibility, impact resistance, gloss, hardness, soap and detergent resistance, humidity resistance, hot water soak resistance, salt spray resistance, grease resistance, and resistance to ultra-violet exposure. Test results show that the initial presence of the indicated polyhydric alcohols at effective proportions for adhesion promotion is not detrimental to the properties of the cured coatings. The film property ratings for the cured enamels of the described invention compositions are at least equal to the ratings for the comparative compositions which do not include the polyhydric alcohol.

In a series of commercial tests, ferrous metal refrigerator parts are provided with an anti-corrosion treatment by subjecting the parts to a "Bonderite" phosphatizing treatment followed by immersing the parts in an aqueous chromic acid bath at 0.3% to 0.6% concentration, rinsing with distilled water, and drying of the treated metal to remove residual water. Example 1 compositions, Example 2 compositions and comparative composition A are respectively applied to these metal parts at about 1.8 mils dry thickness and cured by heating for 30 minutes at 320° F.

Neither the Example 1 finishes nor the Example 2 finishes exhibit adhesion deficiency. The finish of comparative composition A exhibits variation in adhesion over the metal substrate, some areas having poor adhesion and other areas having satisfactory adhesion comparable with that of the example finishes of the invention. Areas of poor adhesion are associated with readily detectable residues of chromic acid which are present as a result of inadequate water rinsing. Metal parts removed from the production line and subjected to exhaustive water rinsing and subsequently finished with the comparative composition A exhibits no adhesion deficiency. However, exhaustive rinsing is impractical for commercial production operations.

The invention coating compositions containing the polyhydric alcohol counteract variations in adhesion caused from variations in concentration of acid residues in the treated metal as a result of non-uniform rinsing. While it is more convenient and more effective to include the useful polyhydric alcohols in the liquid coating composition as applied to the acid-contaminated metal substrate, i.e., the organic film-forming material is applied to the metal in the presence of the effective polyhydric alcohol, it is feasible to counteract the detrimental effects of the acid residues by including an effective small proportion of the useful polyhydric alcohols, especially the preferred polyhydric alcohols, e.g., glycerol and the lower glycols, in the water rinse following the chromic acid treatment. Such an aqueous polyhydric rinse having an effective polyhydric alcohol content of 0.3% to 6%, preferably up to about 4%, promotes improved adhesion with a uniforming effect on the acid-treated metal surface which is recognized ordinarily as non-uniform in its adhesion-promoting characteristics.

We claim:

1. A heat-curable organic coating composition having as the essential organic film-forming material a compatible combination of (A) an interpolymer of a plurality of copolymerizable alpha monoethylenically-unsaturated monomers including a carboxylic monomer and an ester of an alpha, beta monoethylenically-unsaturated monocarboxylic acid having a terminal methylene group and a saturated aliphatic monohydric alcohol and (B) at least one compatible member of the group consisting of epoxy condensates having at least one 1,2-oxirane group per molecule, esters of a monocarboxylic acid and an epoxyhydroxy polyether condensate having at least one 1,2-oxirane group per molecule, epoxidized vegetable oils, melamine-formaldehyde-monohydric alcohol condensates, urea-formaldehyde-monohydric alcohol condensates, and benzoguanamine-formaldehyde-monohydric alcohol condensates, said combination being in solution in a volatile liquid organic solvent therefor, and having in solution in said solvent from 0.3% to 10% by weight of a water soluble polyhydric alcohol based on the total weight of the composition, said polyhydric alcohol being composed of carbon, hydrogen and oxygen atoms and characterized by 2 to 4 hydroxyl susbtituents per molecule of which at least one is a primary hydroxyl substituent, a molecular weight up to about 200, and as being soluble in and compatible with said coating composition.

2. A composition of claim 1 wherein said polyhydric alcohol has from 2 to 6 carbon atoms and a plurality of primary hydroxyl substituents.

3. A composition of claim 2 wherein said polyhydric alcohol has from 2 to 3 hydroxyl substituents including at least two primary hydroxyl substituents.

4. A composition of claim 2 wherein the ratio of primary hydroxyl substituents to total carbon atoms per molecule of the polyhydric alcohol is in the range of 0.5 to 1 hydroxyl per carbon atom.

5. A composition of claim 3 wherein said polyhydric alcohol is trihydric.

6. A composition of claim 5 wherein said trihydric alcohol is glycerol.

7. A composition of claim 5 wherein said trihydric alcohol is 1,2,6-hexanetriol.

8. A composition of claim 3 wherein said polyhydric alcohol is an alpha, omega dihydric alcohol.

9. A composition of claim 8 wherein said dihydric alcohol is ethylene glycol.

10. A composition of claim 1 wherein interpolymer (A) is a terpolymer made up of (a) units from a vinyl aromatic hydrocarbon, (b) units from an ester of acrylic acid and a saturated aliphatic monohydric alcohol and (c) units from said carboxylic monomer, the proportion of said (c) units providing from 1 to 25 mol percent of carboxyl substituent per interpolymer molecule.

11. A composition of claim 10 wherein said interpolymer is made up of said (a) units from styrene, said (b) units from ethyl acrylate and said (c) units from a half ester of maleic acid and a saturated aliphatic monohydric alcohol.

12. A composition of claim 1 wherein said organic film-forming combination of A and B in 100 parts by weight thereof is made up of 30 to 95 parts of said A interpolymer and 70 to 5 parts of B including at least 5 parts of said epoxy material having at least one 1,2-oxirane group per molecule.

13. A composition of claim 12 wherein said A interpolymer is in the proportions of 60 to 90 parts and said B film-forming material is in the proportions of 40 to 10 parts.

14. A heat-curable coating composition comprising pigment, organic film-forming material consisting essentially of a combination which per 100 parts by weight thereof consists essentially of 30 to 95 parts of (A) a terpolymer made up of (a) units from styrene, (b) units from an ester of acrylic acid and a saturated aliphatic monohydric alcohol and (c) units from a carboxylic monomer in an amount sufficient to provide from 1 to 25 mol percent of carboxyl substituent per molecule, and 70 to 5 parts of (B) of at least one member selected from the group consisting of epoxy condensates having at least one 1,2-oxirane group per molecule, esters of a monocarboxylic acid and an epoxyhydroxy polyether condensate having at least one 1,2-oxirane group per molecule, epoxidized vegetable oils, melamine-formaldehyde-monohydric alcohol condensates, urea-formaldehyde-monohydric alcohol condensates, and benzoguanamine-formaldehyde-monohydric alcohol condensates, including at least 5 parts of epoxy material having at least one 1,2-oxirane group per molecule, said film-forming combination being in solution in a volatile liquid organic solvent therefor, and 0.3% to 6%, based on the weight of the total composition, of a water-soluble polyhydric alcohol characterized as soluble in said solvent, having 2 to 6 carbon atoms, 2 to 4 hydroxyl substituents including a plurality of primary hydroxyl substituents per molecule, and being composed of carbon, hydrogen and oxygen atoms.

References Cited by the Examiner

UNITED STATES PATENTS

| | | | |
|---|---|---|---|
| 2,505,785 | 5/50 | Moore | 148—6.16 |
| 2,731,444 | 1/56 | Greenlee | 260—47 |
| 2,739,126 | 3/56 | Benbury et al. | 106—14 XR |
| 2,853,463 | 9/58 | Gaylord | 260—851 |
| 2,868,742 | 1/59 | Burnham | 106—14 XR |
| 2,911,309 | 11/59 | Rudel et al. | 106—14 |
| 2,967,162 | 1/61 | Vasta | 260—21 |
| 3,037,955 | 6/62 | Carmen | 260—33.4 |

LEON J. BERCOVITZ, *Primary Examiner.*

MILTON STERMAN, DONALD E. CZAJA,
*Examiners.*